United States Patent [19]

Kawano et al.

[11] Patent Number: 5,440,491
[45] Date of Patent: Aug. 8, 1995

[54] PSEUDO GPS SIGNAL TRANSMITTING SYSTEM IN A BASE STATION

[75] Inventors: Shuichi Kawano; Masatoshi Harigae, both of Yokohama, Japan

[73] Assignee: Kabushiki Kaisha Toshiba, Kawasaki, Japan

[21] Appl. No.: 324,503

[22] Filed: Oct. 18, 1994

[30] Foreign Application Priority Data

Oct. 19, 1993 [JP] Japan .................. 5-260679
Dec. 2, 1993 [JP] Japan .................. 5-303061

[51] Int. Cl.6 .................. H04B 7/185; G01S 5/08
[52] U.S. Cl. .................. 364/443; 364/456; 364/460; 342/352; 342/357; 342/463
[58] Field of Search .................. 364/443, 455, 456, 459, 364/460, 449, 561, 569; 375/1, 25, 59, 75; 342/357, 358, 359, 362, 407, 442, 450, 463, 352, 458

[56] References Cited

U.S. PATENT DOCUMENTS

| | | | |
|---|---|---|---|
| 4,785,463 | 11/1988 | Jane et al. | 342/386 |
| 4,970,523 | 11/1990 | Braisted et al. | 342/418 |
| 5,081,463 | 1/1992 | Tachita et al. | 342/352 |
| 5,101,416 | 3/1992 | Fenton et al. | 342/357 |
| 5,117,232 | 5/1992 | Cantwell | 342/380 |
| 5,119,102 | 7/1992 | Barnard | 364/460 |
| 5,153,598 | 10/1992 | Alves, Jr. | 342/352 |
| 5,153,599 | 10/1992 | Harigae et al. | 342/352 |
| 5,194,871 | 3/1993 | Counselman, III | 342/450 |
| 5,202,829 | 4/1993 | Geier | 364/449 |

*Primary Examiner*—Kevin J. Teska
*Assistant Examiner*—Tan Q. Nguyen
*Attorney, Agent, or Firm*—Oblon, Spivak, McClelland, Maier & Neustadt

[57] ABSTRACT

The object of this invention is to prevent GPS time monitor errors from effecting the distance-measuring accuracy. To achieve the object, a monitor GPS receiver receives GPS signals from each GPS satellite via a receiving antenna, senses satellite data, and obtains observation data on the basis of user clock pulses synchronized with a reference clock from a reference oscillator. A data processing unit computes a pseudo range error value from the satellite data and observation data obtained at the monitor GPS receiver on the basis of the user clock pulses, and formats these data items to generate transmission data. A transmitter combines PN codes with the transmission data on the basis of the user clock pulses to generate a pseudo GPS signal, modulates a carrier signal synchronized with the reference clock, and power-amplifies the modulated output. A transmitting antenna is directed toward a specific stationary satellite and transmits a pseudo GPS signal to a user GPS receiver via the stationary satellite.

3 Claims, 3 Drawing Sheets

PSEUDO GPS SIGNAL TRANSMITTING SYSTEM IN A BASE STATION

BACKGROUND OF THE INVENTION

1. Field of the Invention

This invention relates to a pseudo GPS signal transmitting system in a base station which is installed on the ground and transmits a pseudo GPS signal for use as one of GPS satellites.

2. Description of the Related Art

To use a conventional base station as one of GPS satellites in determining the position, the time system of the base station is controlled according to the GPS time. Specifically, just as each GPS satellite transmits a distance-measuring signal in synchronization with the GPS time, the base station also transmits a distance-measuring signal (a pseudo GPS signal) of a specified reference point in synchronization with the GPS time.

However, since the Department of Defense has been implementing a selective availability (SA) policy, whereby the accuracy of GPS time is forced to deteriorate, it is very difficult to accurately monitor the GPS time serving as a reference in a base station.

Such monitoring errors in the GPS time in a base station affect the accuracy of measuring distance between the base station and the user's GPS receiver, consequently degrading the position-determining accuracy of the user's GPS receiver.

SUMMARY OF THE INVENTION

As described above, since the pseudo GPS signal transmitting system in a conventional base station cannot monitor the GPS time accurately owing to SA, the monitoring errors affect the accuracy of measuring the distance between the base station and the user's GPS receiver, consequently degrading the position-determining accuracy of the user's GPS receiver.

The object of the present invention is to provide a pseudo GPS transmitting system in a base station which prevents GPS-time monitoring errors due to SA from affecting the accuracy of distance measurement between the base station and the user's GPS receiver, thereby maintaining the position-determining accuracy of the user's GPS receiver.

The foregoing object is accomplished by providing a pseudo GPS signal transmitting system in a base station installed on the ground and transmitting a pseudo GPS signal for use as one of GPS satellites, comprising: a GPS receiving antenna for picking up radio waves from GPS satellites; a monitor GPS receiver containing a receiving section for receiving GPS signals from each GPS satellite via the GPS receiving antenna, a satellite data sensing section for sensing satellite data from the received GPS signals, a pulse generating section for generating user clock pulses synchronized with a reference clock, and an observation data calculating section for obtaining observation data from the received GPS signals on the basis of the user clock pulses; a data processing unit containing an error data computing section for determining a pseudo range error value for the theoretical distance between a transmitting GPS satellite and a known receiving point from the satellite data and the observation data obtained at the monitor GPS receiver, and a transmission data generating section for formatting these data items in a specified manner to generate transmission data; a transmitter containing a PN code generating section for generating PN codes for spectrum diffusion in synchronization with the user clock pulses, a pseudo GPS signal generating section for generating pseudo GPS signals by combining PN codes generated at the PN code generating section with the transmission data from the data processing unit on the basis of the user clock pulses, a carrier generating section for generating a carrier signal synchronized with the reference clock, a modulator for modulating the carrier signal generated at the carrier generating section using the pseudo GPS signal, and a power amplifier for power-amplifying the output of the modulator; and a transmitting antenna for transmitting the pseudo GPS signal from the transmitter in a given direction, wherein the pseudo GPS signal sent from the transmitting antenna is transmitted directly or via a specific stationary satellite to a user GPS receiver.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Hereinafter, referring to the accompanying drawings, embodiments of the present invention will be explained.

Figure 1:
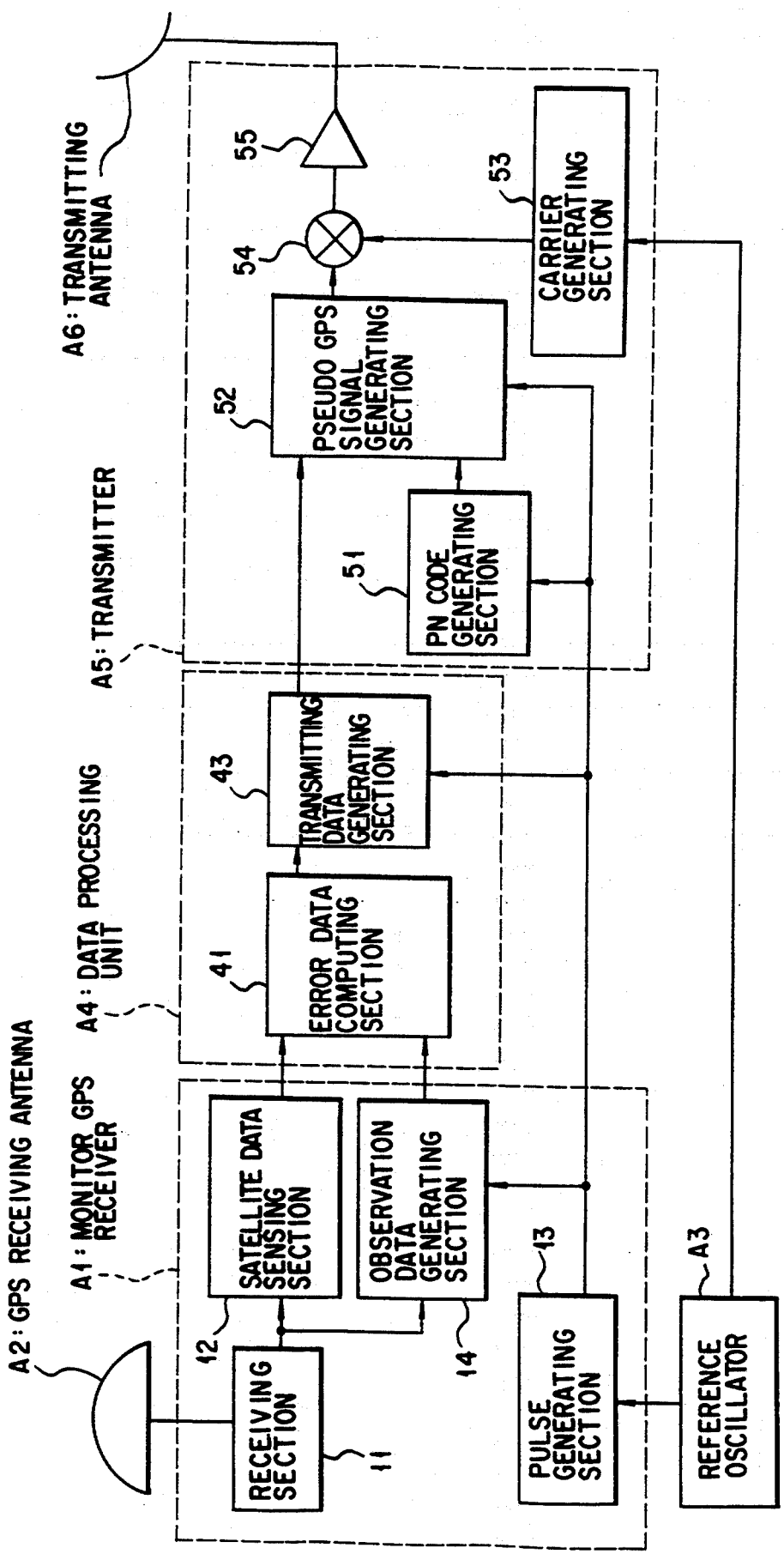
FIG. 1 is a block circuit diagram of a first embodiment of a pseudo GPS signal transmitting system in a base station according to the present invention.

FIG. 1 shows the configuration of a first embodiment of a pseudo GPS signal transmission system according to the present invention.

A monitor GPS receiver A1 comprises a receiving section 11 for receiving the GPS signal from each GPS satellite via a GPS receiving antenna A2, a satellite data sensing section 12 for sensing satellite data (ephemeris and almanac) from the received GPS signals, a pulse generating section 13 for generating user clock pulses synchronized with the reference clock from a reference oscillator A3, and an observation data calculating section 14 for obtaining the observation data (including a pseudo range, and a delta range) from the received GPS signals in accordance with the user clock pulses.

A data processing unit A4 comprises an error data computing section 41 for determining the pseudo range error value for the theoretical distance between the transmitting GPS satellite and the receiving point (known) from the satellite data and observation data obtained from the monitor GPS receiver A1, and a transmission data generating section 43 for producing transmission data by formatting these data items in a specified manner.

A transmitter A5 comprises a PN code generating section 51 for spectrum diffusion, a pseudo GPS signal generating section 52 for producing a pseudo GPS signal by combining the PN codes generated at the PN code generating section with the transmission data from the data processing unit A4, a carrier generating section 53 for producing a carrier signal synchronized with the reference clock from the reference oscillator A3, a modulator 54 for modulating the generated carrier signal using the pseudo GPS signal, and a power amplifier 55 for power-amplifying the output of the modulator 54.

A GPS transmitting antenna A6 is directed toward a specific stationary satellite and transmits the pseudo GPS signal from the transmitter A5 to a user GPS receiver via the stationary satellite.

That is, with the above configuration, the entire processing is effected in synchronization with the user clock pulses. Hereinafter, such processing is called a user clock synchronizing method.

Since the format of the transmission data is written in various technical books and documents, its detailed explanation will be omitted. The method is characterized in that the amount of delay in the pseudo GPS signal over the entire hardware is added as overlay channel correlation data items.

Hereinafter, using overlay as an example, explanation will be given as to how the user GPS receiver determines the position by the user clock synchronizing method, regardless of time errors due to SA.

Figure 2:
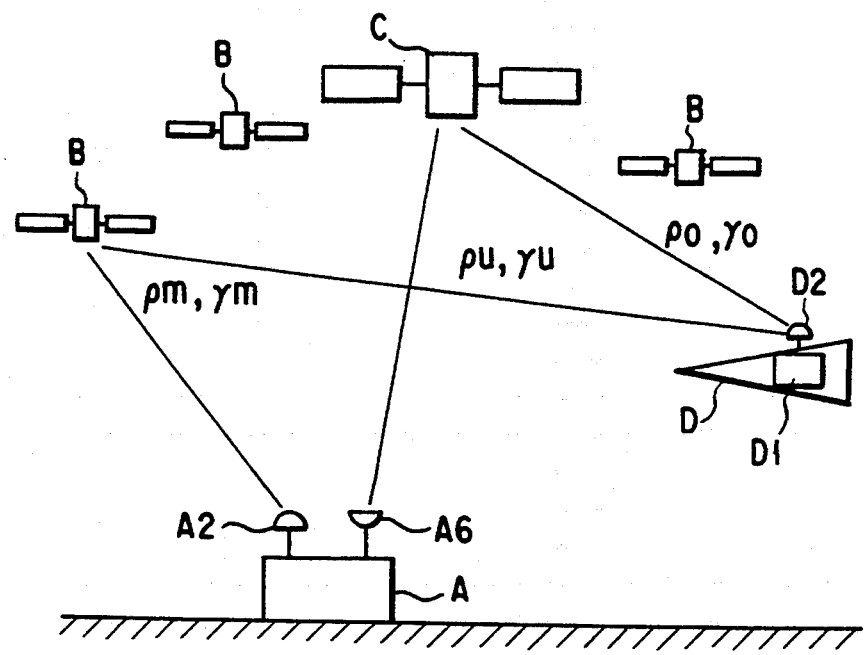
FIG. 2 showing a basic concept of overlay in the first embodiment.

FIG. 2 shows a basic concept of overlay. In the figure, reference symbol A indicates the base station of FIG. 1, B a GPS satellite, C a stationary satellite equipped with a transponder that receives radio waves from the base station A and reradiates them toward a specific range, D a navigating object (user) now moving in the specific range, D1 a user GPS receiver, and D2 a user GPS antenna. Here, the parameters in FIG. 2 are defined as follows:

$\rho_m$: the pseudo range between GPS satellite B and GPS receiving antenna A2

$\gamma_m$: the actual distance between GPS satellite B and GPS receiving antenna A2

$\rho_u$: the pseudo range between GPS satellite B and user GPS antenna D2

$\gamma_u$: the actual distance between GPS satellite B and user GPS antenna D2

$\rho_o$: the pseudo range between GPS transmitting antenna A6 and user GPS antenna D2

$\gamma_o$: the actual distance between GPS transmitting antenna A6 and user GPS antenna D2

The relationship between each pseudo range and the corresponding actual distance is as follows:

$$\rho_m = \gamma_m - \Delta\rho_{mc} + \Delta\rho_{all} + \Delta\rho_{sa(t1)} + \Delta\rho_{mh} \quad (1)$$

$$\rho_u = \gamma_u - \Delta\rho_{uc} + \Delta\rho_{all} + \Delta\rho_{sa(t2)} + \Delta\rho_{uh} \quad (2)$$

$$\rho_o = \gamma_o - \Delta\rho_{uc} + \Delta\rho_{tc} + \Delta\rho_{th} + \Delta\rho_{tr} + \Delta\rho_{uh} \quad (3)$$

where $\Delta\rho_{mc}$: a range error due to a clock error (delay) in monitor GPS receiver A1

$\Delta\rho_{uc}$: a range error due to a clock error (delay) in user GPS receiver D1

$\Delta\rho_{tc}$: a range error due to a clock error (delay) in transmitter A5

$\Delta\rho_{all}$: a range error (excluding an SA error) in GPS satellite due to all error factors including the ionosphere $\Delta\rho_{sa}(ti)$: a range error due to an SA error at time ti (i=1, 2, ...)

$\Delta\rho_{mh}$: a hardware delay in monitor GPS receiver A1 (from monitor GPS receiving antenna A2 to a spectrum reverse diffusion)

$\Delta\rho_{uh}$: a hardware delay in user GPS receiver D1 (from user GPS antenna D2 to a spectrum reverse diffusion)

$\Delta\rho_{th}$: a hardware delay in transmitter A5 (from a spectrum diffusion to transmitting antenna A6)

$\Delta\rho_{tr}$: a hardware delay in the transponder of stationary satellite C Here, ionospheric errors in overlay up-link and down-link radio waves are not included in equation (3), assuming that it is possible to remove them by modeling.

From equation (1), the correction value Δpcor for each satellite is expressed as follows:

$$\Delta\rho_{cor} = -\Delta\rho_{mc} + \Delta\rho_{sa(t1)} + \Delta\rho_{mh} \quad (4)$$

Because the user GPS receiver D1 corrects the pseudo range of each of the observed GPS satellites B, from equation (2) and equation (4), the pseudo range $\rho_u'$ after correction is expressed as follows:

$$\rho_u' = \gamma_u - (\Delta\rho_{uc} - \Delta\rho_{mc}) + (\Delta\rho_{sa(t2)} - \Delta\rho_{sa(t1)}) + (-\Delta\rho_{uh} - \Delta\rho_{mh}) \quad (5)$$

Here, since the difference between reception time $t_1$ at the base station and reception time $t_2$ at user GPS receiver D1 is short for the same GPS signal, $\Delta\rho_{sa(t2)}$ can be considered to be almost equal to $\rho_{sa(t1)}$. At this time, $\rho_u'$ is expressed as follows:

$$\rho_u' = \gamma_u - (\Delta\rho_{uc} - \Delta\rho_{mc}) + (\Delta\rho_{uh} - \Delta\rho_{mh}) \quad (6)$$

Now, an overlay signal will be considered. Since $\Delta\rho_{tc}$ synchronizes with $\Delta\rho_{mc}$ in this method, these fulfill the following relationship:

$$\Delta\rho_{mc} = \Delta\rho_{tc} \quad (7)$$

More precisely, $\gamma_o$ is broken down as follows:

$$\gamma_o = \gamma_{ou} + \gamma_{od} \quad (8)$$

where $\gamma_{ou}$: the actual distance between transmitting antenna A6 and stationary satellite C $\gamma_{od}$: the actual distance between stationary satellite C and user GPS antenna D2

Substituting equation (7) and equation (8) into equation (3) gives the following equation:

$$\rho_o = \gamma_{ou} + \gamma_{od} - \Delta\rho_{uc} + \Delta\rho_{mc} + \Delta\rho_{th} + \Delta\rho_{tr} + \Delta\rho_{uh} \quad (9)$$

Here, after $(\gamma_{ou} + \Delta\rho_{th} + \Delta\rho_{tr} + \Delta\rho_{mh})$ is transmitted as overlay channel correction data, from equation (9), the pseudo range $\rho_o'$ after correction at user GPS receiver D1 is expressed as follows:

$$\rho_o' = \gamma_{od} - (\Delta\rho_{uc} - \Delta\rho_{mc}) + (\Delta\rho_{uh} - \Delta\rho_{mh}) \quad (10)$$

Because equation (6) and equation (10) have the same error of $-(\Delta\rho_{uc}-\Delta\rho_{mc})+(\Delta\rho_{uh}-\Delta\rho_{mh})$, it is possible to determine a position using the pseudo GPS signal without being affected by SA.

Therefore, when making DGPS corrections and measuring a distance using the pseudo GPS signal, the pseudo GPS signal transmitting system employing the user clock synchronizing method can avoid time errors due to SA, thereby maintaining the position-determining accuracy of the user GPS receiver.

While in the embodiment, the operation has been explained, using overlay as an example, the method may be applied to a pseudolite approach in which a pseudo GPS signal is transmitted directly to a user GPS receiver, not by way of a stationary satellite.

Figure 3:
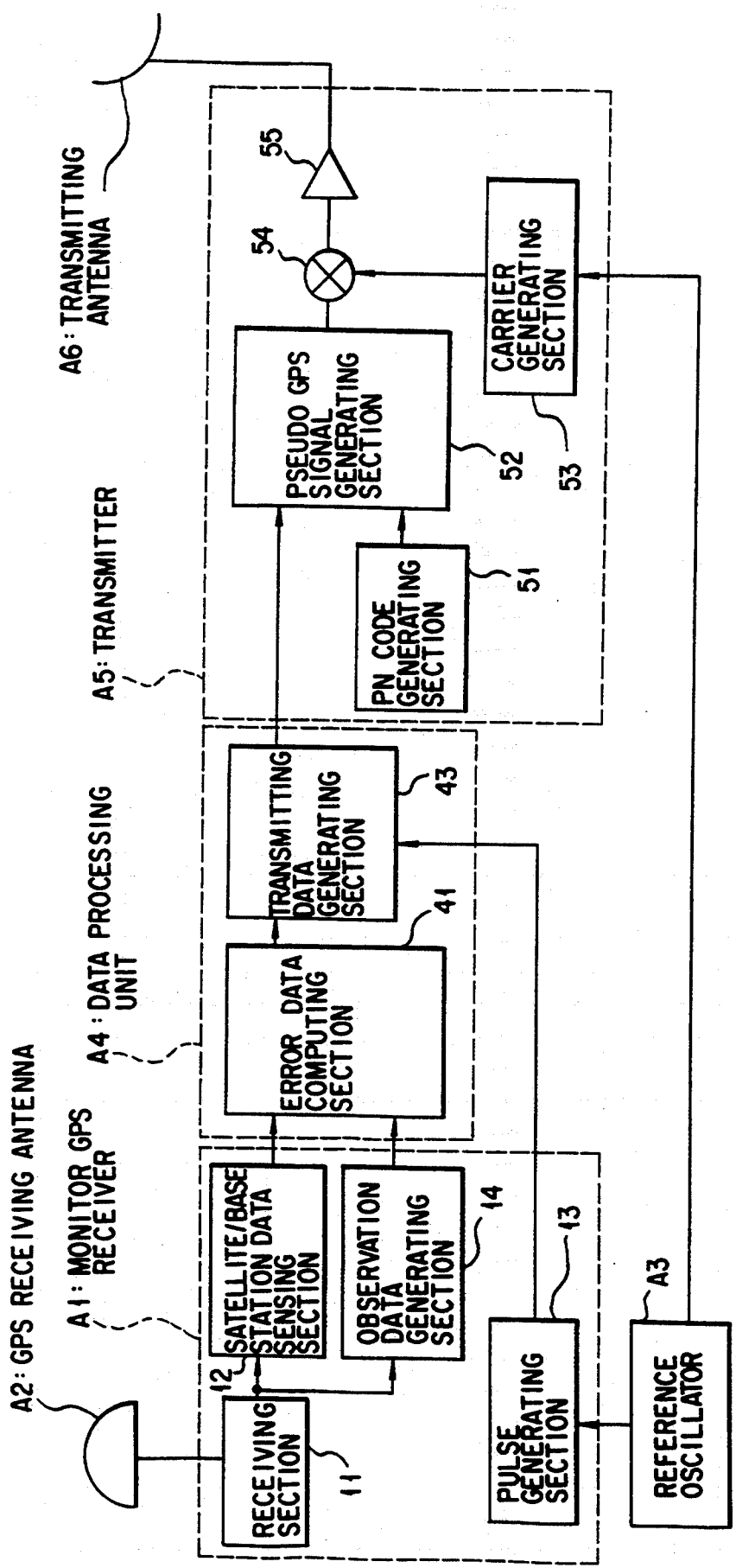
FIG. 3 is a block circuit diagram of a second embodiment of a pseudo GPS signal transmitting system in a base station according to the present invention.

FIG. 3 shows the configuration of a second embodiment of a pseudo GPS signal transmitting system according to the present invention. In FIG. 3, the same parts as those in FIG. 1 are indicated by the same reference symbols.

A monitor GPS receiver A1 comprises a receiving section 11 for receiving GPS signals from a plurality of GPS satellites and a pseudo GPS signal from another base station via a GPS receiving antenna A2, a satellite/base station data sensing section 12 for sensing satellite data (ephemeris and almanac) from the received GPS signals and the base station data (including the position of the base station) from the pseudo GPS signal, a pulse generating section 13 for generating user clock pulses synchronized with the reference clock from a reference oscillator A3, and an observation data calculating section 14 for obtaining the observation data (including a pseudo range, and a delta range) from the received GPS signal and pseudo GPS signal in accordance with the user clock pulses.

A data processing unit A4 comprises an error data computing section 41 for determining the pseudo range error value for the theoretical distance between the transmitting GPS satellite and the receiving point (known) and the pseudo range error value for the theoretical distance between another transmitting base station and the receiving point (known) from the satellite/base station data and observation data obtained from the monitor GPS receiver A1, and a transmission data generating section 43 for producing transmission data by formatting these data items in a specified manner.

A transmitter A5 comprises a PN code generating section 51 for spectrum diffusion, a pseudo GPS signal generating section 52 for producing pseudo GPS signals by combining PN codes generated at the PN code generating section with the transmission data from the data processing unit A4, a carrier generating section 53 for producing a carrier signal synchronized with the reference clock from the reference oscillator A3, a modulator 54 for modulating the generated carrier signal using the pseudo GPS signal, and a power amplifier 55 for power-amplifying the output of the modulator 54.

A GPS transmitting antenna A6 transmits the pseudo GPS signal from the transmitter A5 to a user GPS receiver and another base station.

That is, with the above configuration, a pseudo GPS signal is generated by, on the basis of the pseudo GPS signal transmitted from the different station, making DGPS corrections and measuring a distance, taking into account time errors between this station and a different station.

Since the format of the transmission data has been written in various technical books and documents, its detailed explanation will be omitted. The method is characterized in that the amount of delay in the pseudo GPS signal over the entire hardware is added as one of the data items.

Hereinafter, using a case where two pseudolite terrestrial stations as base stations, explanation will be given as to how a user GPS receiver measures the position, regardless of time errors due to SA.

Figure 4:
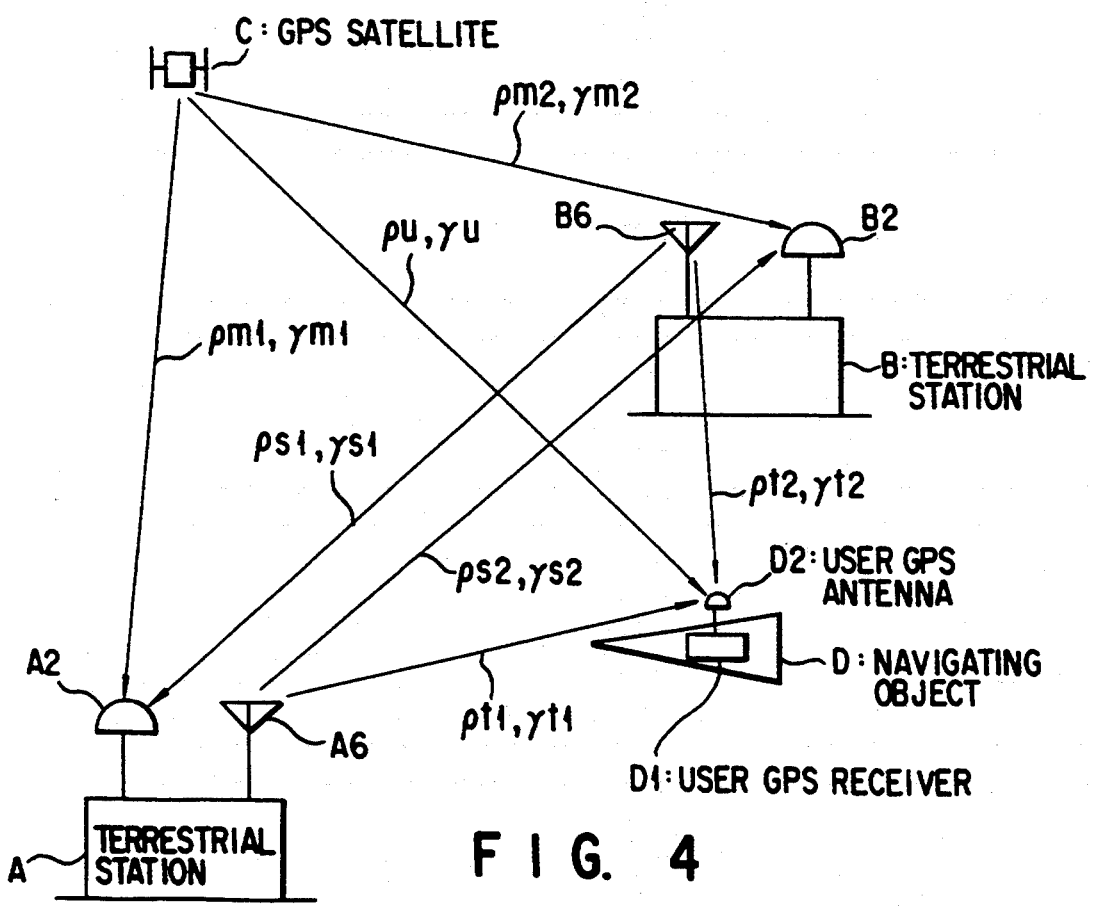
FIG. 4 shows a basic concept of the entire system in a case where there are two pseudolite terrestrial stations as base stations in the second embodiment.

FIG. 4 shows a basic concept of the entire system. In the figure, reference symbols A and B indicate pseudolite terrestrial stations, C a GPS satellite, D a navigating object (user) now moving in a range where it can receive the respective pseudo GPS signals from the terrestrial stations A and B and the GPS signal from a GPS satellite C, D1 a user GPS receiver, and D2 a user GPS antenna. Here, the parameters in FIG. 4 are defined as follows:

$\rho_{m1}$: the pseudo range between GPS satellite C and GPS receiving antenna A2 at terrestrial station A $\gamma_{m1}$: the actual distance between GPS satellite C and GPS receiving antenna A2 at terrestrial station A $\rho_{m2}$: the pseudo range between GPS satellite C and GPS receiving antenna B2 at terrestrial station B $\gamma_{m2}$: the actual distance between GPS satellite C and GPS receiving antenna B2 at terrestrial station B $\rho_u$: the pseudo range between GPS satellite C and user GPS antenna D2

$\gamma_u$: the actual distance between GPS satellite C and user GPS antenna D2

$\rho_{s1}$: the pseudo range between GPS transmitting antenna B6 at terrestrial station B and GPS receiving antenna A2 at terrestrial station A $\gamma_{s1}$: the actual distance between GPS transmitting antenna B6 at terrestrial station B and GPS receiving antenna A2 at terrestrial station B $\rho_{s2}$: the pseudo range between GPS transmitting antenna A6 at terrestrial station A and GPS receiving antenna B2 at terrestrial station B $\gamma_{s2}$: the actual distance between GPS transmitting antenna A6 at terrestrial station A and GPS receiving antenna B2 at terrestrial station B $\rho_{t1}$: the pseudo range between GPS transmitting antenna A6 at terrestrial station A and user GPS antenna D2

$\gamma_{t1}$: the actual distance between GPS transmitting antenna A6 at terrestrial station A and user GPS antenna D2

$\rho_{t2}$: the pseudo range between GPS transmitting antenna B6 at terrestrial station B and user GPS antenna D2

$\gamma_{t2}$: the actual distance between GPS transmitting antenna B6 at terrestrial station B and user GPS antenna D2

The relationship between each pseudo range and the corresponding actual distance is as follows:

$$\rho_{m1}=\gamma_{m1}-\Delta\rho_{mc1}+\Delta\rho_{all}+\Delta\rho_{sa} \tag{11}$$

$$\rho_{m2}=\gamma_{m2}-\Delta\rho_{mc1}+\Delta\rho_{all}+\Delta\rho_{sa} \tag{12}$$

$$\rho_u=\gamma_u-\Delta\rho_{uc}+\Delta\rho_{all}+\Delta\rho_{sa} \tag{13}$$

$$\rho_{s1}=\gamma_{s1}-\Delta\rho_{mc1}+\Delta\rho_{tc2} \tag{14}$$

$$\rho_{s2}=\gamma_{s2}-\Delta\rho_{mc1}+\Delta\rho_{tc1} \tag{15}$$

$$\rho_{t1}=\gamma_{t1}-\Delta\rho_{uc}+\Delta\rho_{tc1} \tag{16}$$

$$\rho_{t2} = \gamma_{t2} - \Delta\rho_{uc} + \Delta\rho_{tc2} \quad (17)$$

where $\Delta\rho_{mc1}$: a range error due to a clock error (delay) in monitor GPS receiver A1 at terrestrial station A $\Delta\rho_{mc2}$: a range error due to a clock error (delay) in monitor GPS receiver B1 at terrestrial station B $\Delta\rho_{uc}$: a range error due to a clock error (delay) in user GPS receiver D1

$\Delta\rho_{tc1}$: a range error due to a clock error (delay) in transmitter A5 at terrestrial station A $\Delta\rho_{tc2}$: a range error due to a clock error (delay) in transmitter B5 at terrestrial station B $\Delta\rho_{all}$: a range error (excluding an SA error) in GPS satellite C due to all error factors including the ionosphere $\Delta\rho_{sa}$: a range error due to an SA error From equation (11), the correction value $\Delta\rho_{cor1}$ for GPS satellite C is expressed as follows:

$$\Delta\rho_{cor1} = -\Delta\rho_{mc1} + \Delta\rho_{all} + \Delta\rho_{sa} \quad (18)$$

Because the user GPS receiver D1 corrects the pseudo range of each of the observed GPS satellites C, from equation (13) and equation (18), the pseudo range $\rho_u'$ after correction is expressed as follows:

$$\rho_u' = \gamma_u - \Delta\rho_{uc} + \Delta\rho_{mc1} \quad (19)$$

Now, a pseudolite signal will be considered. When the transmission signal from the pseudolite terrestrial station B is monitored at the pseudolite terrestrial station A, the correction value $\Delta\rho_{cor2}$ can be determined by the following equation at pseudolite terrestrial station:

$$\Delta\rho_{cor2} = -\rho_{mc1} + \Delta\rho_{tc2} \quad (20)$$

On the other hand, the user GPS receiver D1 receives correction value $\Delta\rho_{cor2}$ of pseudolite terrestrial station B carried on the data from pseudolite station A, and then corrects the pseudo range of the pseudolite terrestrial station B observed with user GPS receiver D. The pseudo range $\rho_{t2}'$ after correction can be determined from the following equation derived from equation (17) and equation (20):

$$\rho_{t2}' = \gamma_{t2} - \Delta\Delta\rho_{uc} + \Delta\rho_{mc1} \quad (21)$$

The case where monitoring is effected at pseudolite terrestrial station A has been explained. Similarly, a case where monitoring is effected at pseudolite terrestrial station B will be considered. The pseudo range $\rho_{u2}'$ after correction for each GPS satellite is expressed as follows:

$$\rho_{u2}' = \gamma_u - \Delta\rho_{uc} + \Delta\rho_{mc2} \quad (22)$$

The pseudo range $\rho_{t1}'$ after correction in the pseudolite terrestrial station A is expressed as follows:

$$\rho_{t1}' = \gamma_{t1} - \rho_{uc} + \Delta\rho_{mc2} \quad (23)$$

With the user GPS receiver D1, when use of pseudolite terrestrial station B achieves DOP (Dilution of Precision) optimum, a position can be determined from equation (19) and equation (21) (because these equations have the same expression: a common error—$\Delta\rho_{uc} + \Delta\rho_{mc1}$). Similarly, when use of pseudolite terrestrial station A achieves DOP optimum, a position can be determined from equation (22) and equation (23).

Furthermore, a case where DOP optimum is achieved when both pseudolite stations A and B are used will be considered. By substituting the values for the same GPS satellite C into equation (19) and equation (22) to obtain the difference between them, the difference between $\Delta\rho_{mc1}$ and $\Delta\rho_{mc2}$ can be determined as follows:

$$\Delta\rho_{mc1} - \Delta\rho_{mc2} = \rho_{u1}' - \rho_{u2} \quad (24)$$

Therefore, a position can be determined by using equation (19), equation (21), equation (23) and equation (24), or by using equation (21), equation (22), equation (23), and equation (24).

Accordingly, with the base-station's pseudo GPS signal transmitting system constructed as described above, a pseudo GPS signal is generated by, on the basis of the pseudo GPS signal from another base station, making DGPS corrections and measuring a distance, taking into account time errors between the base stations. This enables the user to avoid time errors due to SA, thereby maintaining the position-determining accuracy of the user GPS receiver.

While in the embodiment, two pseudolite terrestrial stations are used, a position can be determined even when three or more pseudo terrestrial stations are used. The present invention is not limited to the pseudolite technique, but may be applied to range overlay.

The present invention may be practiced or embodied in still other ways without departing from the spirit or essential character thereof.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A pseudo GPS signal transmitting system in a base station installed on the ground and transmitting a pseudo GPS signal for use as one of GPS satellites, comprising:

a GPS receiving antenna for picking up radio waves from GPS satellites;

a monitor GPS receiver containing a receiving section for receiving GPS signals from each GPS satellite via said GPS receiving antenna, a satellite data sensing section for sensing satellite data from the received GPS signals, a pulse generating section for generating user clock pulses synchronized with a reference clock, and an observation data calculating section for obtaining observation data from the received GPS signals on the basis of the user clock pulses;

a data processing unit containing an error data computing section for determining a pseudo range error value for the theoretical distance between a transmitting GPS satellite and a known receiving point from the satellite data and the observation data obtained at said monitor GPS receiver, and a transmission data generating section for formatting these data items in a specified manner to generate transmission data;

a transmitter containing a PN code generating section for generating PN codes for spectrum diffusion in synchronization with said user clock pulses, a pseudo GPS signal generating section for generating pseudo GPS signals by combining PN codes generated at the PN code generating section with the transmission data from said data processing unit on the basis of said user clock pulses, a carrier generating section for generating a carrier signal synchronized with said reference clock, a modulator for modulating the carrier signal generated at said carrier generating section using said pseudo GPS signal, and a power amplifier for power-amplifying the output of said modulator; and a transmitting antenna for transmitting the pseudo GPS signal from said transmitter in a given direction, wherein the pseudo GPS signal sent from said transmitting antenna is transmitted directly or via a specific stationary satellite to a user GPS receiver.

2. A pseudo GPS signal transmitting system in a base station installed on the ground and transmitting pseudo GPS signals for use as one of GPS satellites, comprising:

a GPS receiving antenna for picking up GPS signals from GPS satellites and a pseudo GPS signal from a different base station;

a monitor GPS receiver containing a receiving section for receiving GPS signals from said GPS satellites and a pseudo GPS signal from said different base station via said GPS receiving antenna, a satellite/base station data sensing section for sensing satellite data and base station data from the received GPS signals and pseudo GPS signal, a pulse generating section for generating clock pulses synchronized with a reference clock, and an observation data calculating section for obtaining observation data from the received GPS signals and pseudo GPS signal on the basis of the clock pulses;

a data processing unit containing an error data computing section for determining a pseudo range error value for the theoretical distances between a transmitting GPS satellite and a known receiving point and between the different base station and the known receiving point from the satellite data, base station data, and observation data obtained at said monitor GPS receiver, and a transmission data generating section for formatting these data items in a specified manner to generate transmission data;

a transmitter containing a PN code generating section for generating PN codes for spectrum diffusion, a pseudo GPS signal generating section for generating pseudo GPS signals by combining PN codes generated at the PN code generating section and the transmission data from said data processing unit, a carrier generating section for generating a carrier signal synchronized with said reference clock, a modulator for modulating the carrier signal generated at said carrier generating section using said pseudo GPS signal, and a power amplifier for power-amplifying the output of said modulator; and a transmitting antenna for transmitting the pseudo GPS signal from said transmitter.

3. A pseudo GPS signal transmitting system in a base station according to claim 1 or 2, wherein said error data computing section adds the amount of delay in the GPS signal over the entire hardware as one of data items for computing error data.

* * * * *